(12) United States Patent
Bäthis et al.

(10) Patent No.: US 11,966,069 B2
(45) Date of Patent: Apr. 23, 2024

(54) DISPLAY ELEMENT WITH REDUCED BACKLIGHT IN THE EDGE REGION

(71) Applicant: Continental Automotive Technologies GmbH, Hannover (DE)

(72) Inventors: Jürgen Bäthis, Wetzlar (DE); Oliver Jakoby, Heusenstamm (DE); Andreas Brüninghaus, Wiehl (DE); Jochen Möller, Darmstadt (DE)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 17/925,239

(22) PCT Filed: May 3, 2021

(86) PCT No.: PCT/DE2021/200053
§ 371 (c)(1),
(2) Date: Nov. 14, 2022

(87) PCT Pub. No.: WO2021/228331
PCT Pub. Date: Nov. 18, 2021

(65) Prior Publication Data
US 2023/0350124 A1    Nov. 2, 2023

(30) Foreign Application Priority Data

May 15, 2020  (DE) .................. 10 2020 206 158.0
Feb. 1, 2021  (DE) .................. 10 2021 200 857.7

(51) Int. Cl.
*F21V 8/00*     (2006.01)
*G02F 1/1333*   (2006.01)

(52) U.S. Cl.
CPC ........ *G02B 6/0035* (2013.01); *G02B 6/0043* (2013.01); *G02B 6/005* (2013.01); *G02B 6/0051* (2013.01); *G02B 6/0053* (2013.01); *G02B 6/0058* (2013.01); *G02F 1/133388* (2021.01)

(58) Field of Classification Search
CPC .................. G02B 6/0043; G02F 1/133388
See application file for complete search history.

(56) References Cited

U.S. PATENT DOCUMENTS

| | | | |
|---|---|---|---|
| 5,931,555 A | 8/1999 | Akahane et al. | |
| 6,791,566 B1* | 9/2004 | Kuratomi | G02B 6/0043 345/589 |
| 7,901,103 B2* | 3/2011 | Inoue | G02F 1/133605 362/249.05 |
| 2004/0145915 A1 | 7/2004 | Kim et al. | |
| 2017/0031083 A1* | 2/2017 | Lai | G02B 6/0036 |
| 2017/0031086 A1* | 2/2017 | Lai | G02B 6/0053 |
| 2019/0113783 A1* | 4/2019 | Ji | G02F 1/133504 |
| 2019/0196078 A1 | 6/2019 | Kim et al. | |

OTHER PUBLICATIONS

International Search Report and Written Opinion dated Jul. 16, 2021 from corresponding International patent application No. PCT/DE2021/200053.

* cited by examiner

*Primary Examiner* — Keith G. Delahoussaye (57) ABSTRACT

A display including a display panel and a backlight arranged behind the display panel, with a light guide with edge coupling, wherein the backlight is designed so the light intensity of the backlight is lower in a peripheral region of the display panel than in a central region of the display panel.

11 Claims, 9 Drawing Sheets

DISPLAY ELEMENT WITH REDUCED BACKLIGHT IN THE EDGE REGION

CROSS REFERENCE TO RELATED APPLICATIONS

This U.S. patent application claims the benefit of PCT application No. PCT/DE2021/200053, filed May 3, 2021, which claims the benefit of German patent application No. 10 2020 206 158.0, filed May 15, 2020, and German patent application No. 10 2021 200 857.7, filed Feb. 1, 2021, all of which are hereby incorporated by reference.

TECHNICAL FIELD

The present disclosure relates to a display element with backlight that is reduced in the peripheral region.

BACKGROUND

Non-self-luminous transmissive display elements such as LCDs (liquid crystal displays) require backlight for image representation. The task of the backlight is here to illuminate the display element as uniformly as possible over the entire active surface in order to produce a display that is as homogeneous as possible right up to the peripheral region. A display that is as bright as possible is achieved due to the fact that the alignment of a liquid crystal layer of the display element in combination with the alignment of polarizing filters permits maximum transmission. A dark or black display content, e.g. in the peripheral region, is achieved by way of minimal transmission, which, in contrast to self-luminous displays, is here always greater than zero.

In the automotive sector, but also in household appliances and in other areas of application, there is an observable trend that operating or display functions should be as invisible as possible in the switched-off state in order to achieve a reduced design with smooth, generous surfaces. Technical elements should be visible only when they are needed. Such disappearance technologies are known, for example, under the names "Shytech" or "Camouflage."

Figure 1:
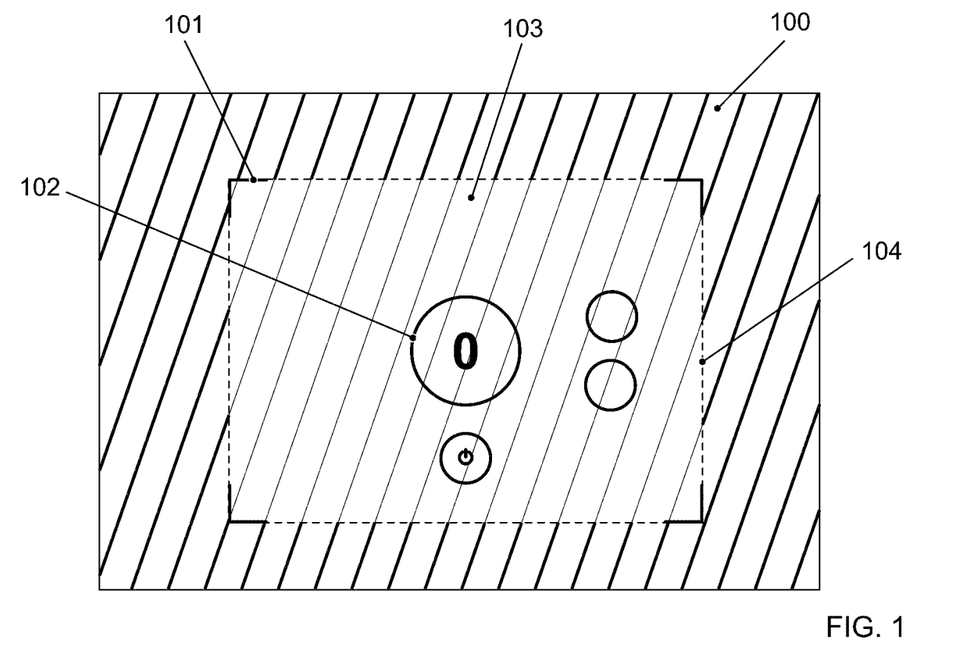
FIG. 1 shows schematically a display with postcard effect.
Figure 2:
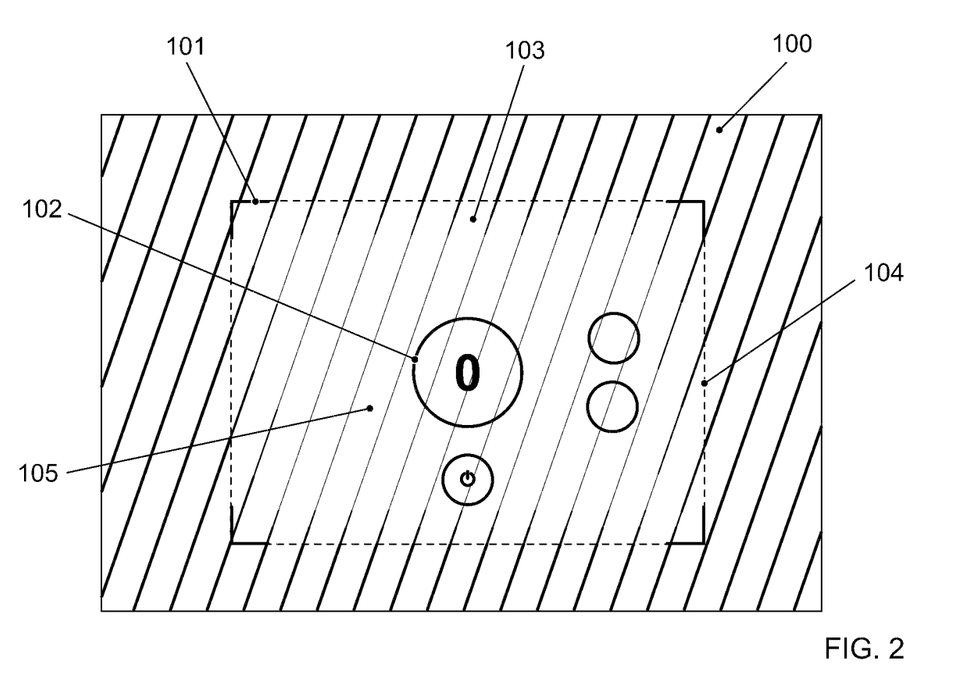
FIG. 2 shows schematically a display without postcard effect.

To implement disappearance technology, for example, a display element can be arranged behind a design surface, e.g. behind a decorative film, a real wood veneer, artificial leather, etc. If the display element is a non-self-luminous display element, an unwanted passepartout effect or postcard effect, as it were, can become visible between the display and the surroundings depending on the brightness conditions. In this case, the peripheral region of the display shows through the overlying design surface. Such an effect is shown in FIG. 1 by way of example. A corresponding display without a passepartout effect or postcard effect is shown in FIG. 2.

One approach to avoiding the passepartout effect or postcard effect is to use a matrix backlight with local dimming (local dimming matrix backlight). The backlight is designed as an illumination matrix in which the brightness of specific matrix elements is modifiable. However, this is a complex and therefore an expensive solution.

It is an object of the disclosure to provide a cheaper alternative based on a simple backlight with a light guide and lateral edge coupling (edge backlight).

SUMMARY

According to a first aspect of the disclosure, a display element has a display panel and a backlight with a light guide with edge coupling arranged behind the display panel. The backlight is designed in such a way that the light intensity of the backlight is lower in a peripheral region of the display panel than in a central region of the display panel.

In an embodiment according to the disclosure, the occurrence of a passepartout effect or postcard effect is prevented or at least mitigated by the fact that the light intensity in the peripheral region, i.e. at the transition between the display and the surroundings, is reduced. In this way, the transition between the display and the surroundings is less clear or even imperceptible to the viewer.

According to one aspect of the disclosure, the light guide has microstructuring for coupling out light, which is designed in such a way that less light is coupled out of the light guide in a region of the light guide for backlighting the peripheral region of the display panel than in a region of the light guide for backlighting the central region of the display panel. The light guide has microstructuring for coupling light out of the light guide. The microstructuring is usually designed in such a way that the most homogeneous lighting possible is achieved. Deviating from this, in a first embodiment of the invention, the microstructuring is adapted such that less light is coupled out of the light guide in the peripheral region.

According to one aspect of the disclosure, the microstructuring is arranged on the upper side of the light guide, on the lower side of the light guide, or on the upper side and the lower side of the light guide. The arrangement of the microstructuring on the upper side has the advantage that the light is substantially coupled out in the direction of the display panel. In combination with a reflector being located below the light guide, however, there is also the possibility of arranging the microstructuring on the lower side of the light guide and coupling out light substantially in the direction of the reflector. A combination of both approaches is also possible.

According to one aspect of the disclosure, location-dependent coupling of the light out of the light guide is achieved by a location-dependent number of coupling-out structures per unit area or by a location-dependent property of the coupling-out structures. The microstructuring in the peripheral region may be thinned out by a location-dependent number of coupling-out structures per unit area. It is likewise possible for the microstructure elements of the microstructuring to have other location-dependent properties at least in the peripheral region, for example a location-dependent depth structure, a location-dependent angle of inclination, or a location-dependent size. In this way, the intensity of the light that is coupled out of the light guide by the microstructuring may be reduced to a desired value in the peripheral region.

According to one aspect of the disclosure, the light intensity of the backlight has a gradient at least in the peripheral region of the display panel. The gradient allows the display to fade out gently in the direction of the peripheral region. The decrease in light intensity may take place both with a uniform gradient and also with an almost constant progression in the inner region and a steep gradient in the respective fade-out area.

According to one aspect of the disclosure, the backlight has at least one light-influencing fade-out element. As an alternative or in addition to location-dependent coupling out through the microstructuring, there is the possibility of providing one or more additional optical elements that selectively influence the light intensity of the backlight. The use of an additional fade-out element has the advantage that the backlight may use predominantly conventional components, i.e. there is no need for custom-made production. It is sufficient to provide a fade-out element at a suitable point.

According to one aspect of the disclosure, the light-influencing fade-out element is an optical layer of an optical stack of the backlight. Optical stacks are used for various purposes. For example, the layers may be wavelength-selective filters, polarizing films, or films that influence the propagation direction or other optical properties. The light-influencing fade-out element may easily be introduced as an additional layer during the production of the layer stack.

According to one aspect of the disclosure, the light-influencing fade-out element is a print applied to the light guide or to an optical stack of the backlight. The use of a print requires no additional element needing to be produced, adjusted and connected to the other elements.

According to one aspect of the disclosure, the light-influencing fade-out element is an optical layer arranged on a reflector or a print applied to the reflector. Non-self-luminous transmissive display elements often have a reflector which is used to direct as much as possible of the light that does not leave the light guide in the direction of the display panel back into the light guide or in the direction of the display panel. A fade-out element may also be arranged on such a reflector. A relatively large amount of installation space is available in the region below the display panel. The use of a print requires no additional element needing to be produced, adjusted and connected to the other elements.

According to one aspect of the disclosure, the light-influencing fade-out element has a location-dependent transmission. The location-dependent transmission may be achieved, for example, by light-absorbing or light-scattering elements embedded in the fade-out element. The location-dependent transmission may also be achieved by varying a microstructure of the fade-out element or by changing the phase of the material of the fade-out element. This allows the backlight of the display panel to be set in a very controlled, location-dependent manner.

A display element according to the disclosure is for example used to implement a display with disappearance technology, for example in a transport or in a household appliance.

BRIEF DESCRIPTION OF THE DRAWINGS

Further features of the present disclosure will emerge from the following description and the appended claims in conjunction with the Figures, wherein:

DETAILED DESCRIPTION

For a better understanding of the principles of the present disclosure, embodiments of the disclosure will be explained in more detail below with reference to the Figures. The same reference signs are used in the Figures for identical or functionally identical elements and are not necessarily described again for each Figure. It goes without saying that the disclosure is not limited to the illustrated embodiments and that the described features may also be combined or modified without departing from the scope of protection of the disclsoure as defined in the appended claims.

FIG. 1 shows schematically a display with a passepartout effect or postcard effect. It shows the effect of a known display element arranged behind a light-transmissive layer on a viewer. In the example shown, the light-transmissive layer is a decorative surface 100. The decorative design of the decorative surface 100 is indicated in FIG. 1 by hatching. The dimensions of the display element are indicated by corner elements 101. A plurality of symbols 102 are represented by the display element. Due to the backlight of the display element, light passes through the decorative surface 100 in the entire light-transmissive display area 103 of the decorative surface 100, even where no symbols 102 are displayed. This leads to a brightening of the display area 103 that is perceivable by the viewer, which is illustrated in FIG. 1 by the reduced line thickness of the hatching within the display area 103. At the peripheries of the display area 103, this leads to bothersome visible edges 104, i.e. the display area 103 stands out from the decorative surface 100 like a postcard placed on top, or the surrounding decorative surface 100 acts like a passepartout for the display area 103.

FIG. 2 shows a display without a passepartout effect or postcard effect behind a decorative surface 100. The dimensions of the display element are again indicated by corner elements 101. The backlight of the display element is designed such that no or at least hardly any light passes through the decorative surface 100 at the peripheries of the display area 103, while the intensity of the backlight is unchanged in a central region 105 of the display area. This is indicated in FIG. 2 by the variable line thickness of the hatching. The location-dependent backlight means that no bothersome visible edges appear at the peripheries of the display area 103, i.e. the passepartout effect or postcard effect is avoided.

Figure 3:
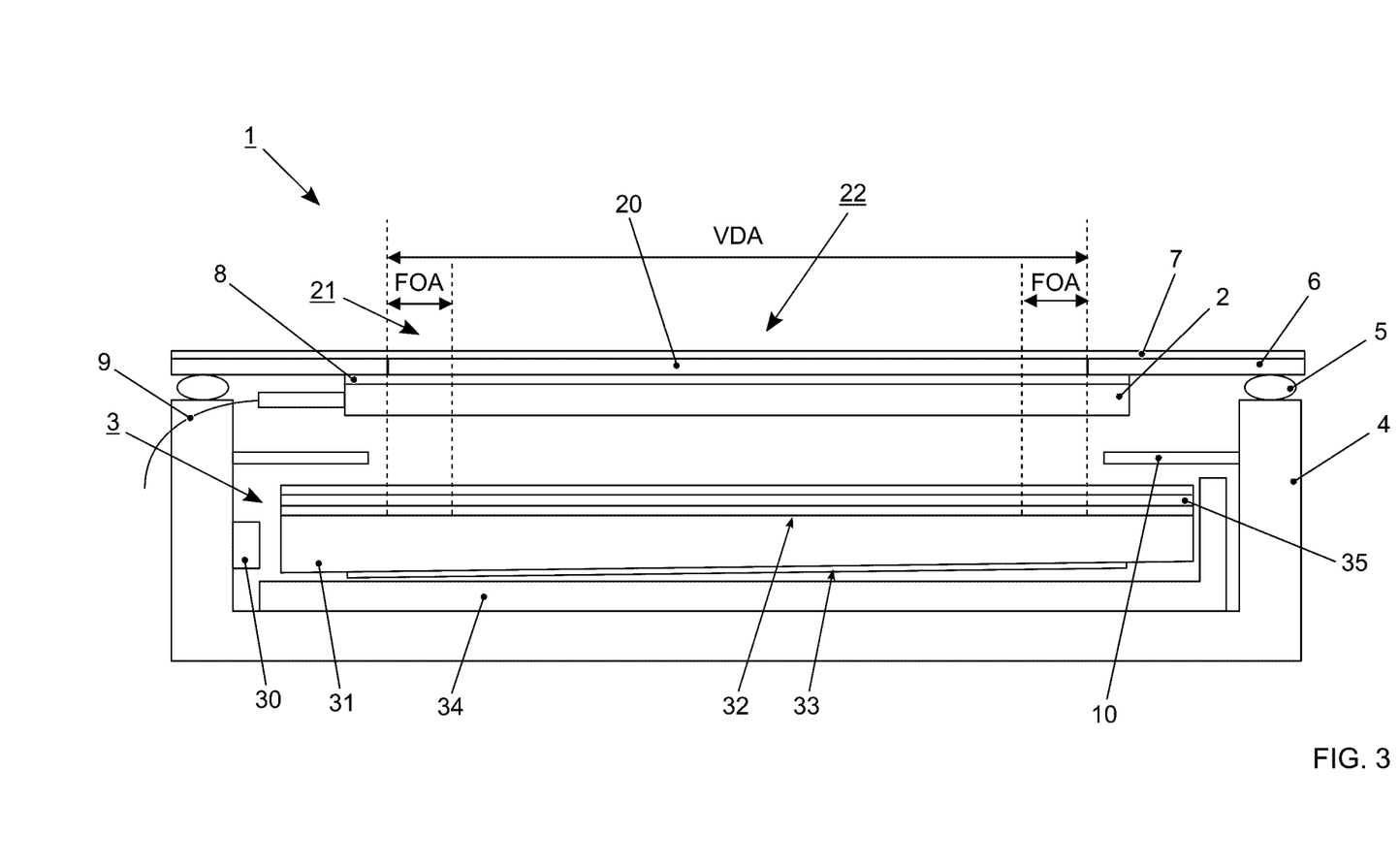
FIG. 3 schematically shows a first embodiment of a display element according to the disclosure.

FIG. 3 schematically shows a first exemplary embodiment of a display element 1 according to the disclosure. The display element 1 has a housing 4 to which a cover plate 6 is fastened by a fastening element 5. The cover plate is provided with a protective layer 7 on its outside facing away from the housing 4. The cover plate 6 has a light-transmissive display area 103, which is designed here as a decorative element, for example as a wood finish. This may be created, for example, by back-injection molding or film back-injection molding.

An externally illuminated display panel 2, for example a liquid crystal display panel (LCD panel), is arranged on the inside of the cover plate 6 facing the housing 4. The display panel 2 extends somewhat beyond the visible display area VDA. It is connected to the cover plate 6 by means of an optically clear connecting element 8. This connecting, also referred to as "optical bonding," takes place, for example, by a curable optically clear liquid or by an optically clear solid, for example a film, which is provided on both sides with an adhesive layer. Alternatively, there can also be an air gap at this point. The display panel 2 is connected via a control line 9 to a control unit (not shown here), which supplies it with energy and with image information to be represented. The display panel 2 is illuminated by a backlight 3.

The backlight 3 has a light source 30 arranged in the lateral region of the housing 4. The light source is preferably a light-emitting diode (LED) or a light source based on LED technology. A fluorescent tube, a laser light source, or other suitable light sources may also be used here. The light generated by the light source 30 is coupled into a light guide 31, which has microstructuring 32, 33 on its lower side or on its upper side, or both on its lower side and on its upper side, through which light is coupled out of the light guide 31. The microstructuring 32, 33 has an irregular structure when viewed on a small scale.

A reflector 34 is arranged below the light guide 31, for example a reflective film or a reflective coating on the inside of the housing 4. The reflector 34 also extends laterally upwards from the light guide 31 in order to direct as much as possible of the light that does not leave the light guide 31 in the direction of the display panel 2 back into the light guide 31 or in the direction of the display panel 2. An optical stack 35 (or optical layer stack) is arranged between the light guide 31 and the display panel 2. The layers of the optical stack 35 influence the light passing through them in different ways, depending on the respective use. They may be wavelength-selective filters, polarizing films, or films that influence the propagation direction or other optical properties. Screens 10 which shade stray light are arranged in a peripheral region between the light guide 31 and the display panel 2.

A double-headed arrow indicates the entire display area VDA of the display element 1 that is visible to a viewer. In the peripheral regions 21, fade-out areas FOA are indicated by double-headed arrows. In these regions 21, the image represented by the display element 1 becomes less and less visible from the inside outwards in the direction of a periphery of the visible display area VDA; it is faded out. For this purpose, the display element 1 has a reduced backlight in the peripheral region. To reduce the backlight, the microstructuring 32, 33 has a gradient when viewed on a large scale from the inside to the outside, for example a decreasing number of microstructure elements per unit area. In this case, the microstructuring 32, 33 is thinned out in the peripheral region. It is likewise possible for the microstructure elements of the microstructuring 32, 33 to have other location-dependent properties at least in the peripheral region, for example a location-dependent depth structure, a location-dependent angle of inclination, or a location-dependent size. The intensity of the light that is coupled out of the light guide 31 by the microstructuring 32, 33 decreases from the inside to the outside, i.e. light output coupling that decreases from the inside to the outside from 100% to x % is achieved in the fade-out area FOA. The value of x can go down to zero in this case. The decrease in intensity may take place both with a uniform gradient and also with an almost constant progression in the inner region and a steep gradient in the respective fade-out area FOA. Thus, the central region 22 of the display panel 2 is illuminated by the backlight 3 with a high light intensity, while its peripheral region 21 is illuminated with a light intensity that decreases toward the outside. A postcard effect therefore does not occur, or is at least so weak that it is not noticed by the viewer or is not perceived as bothersome.

Figure 4:
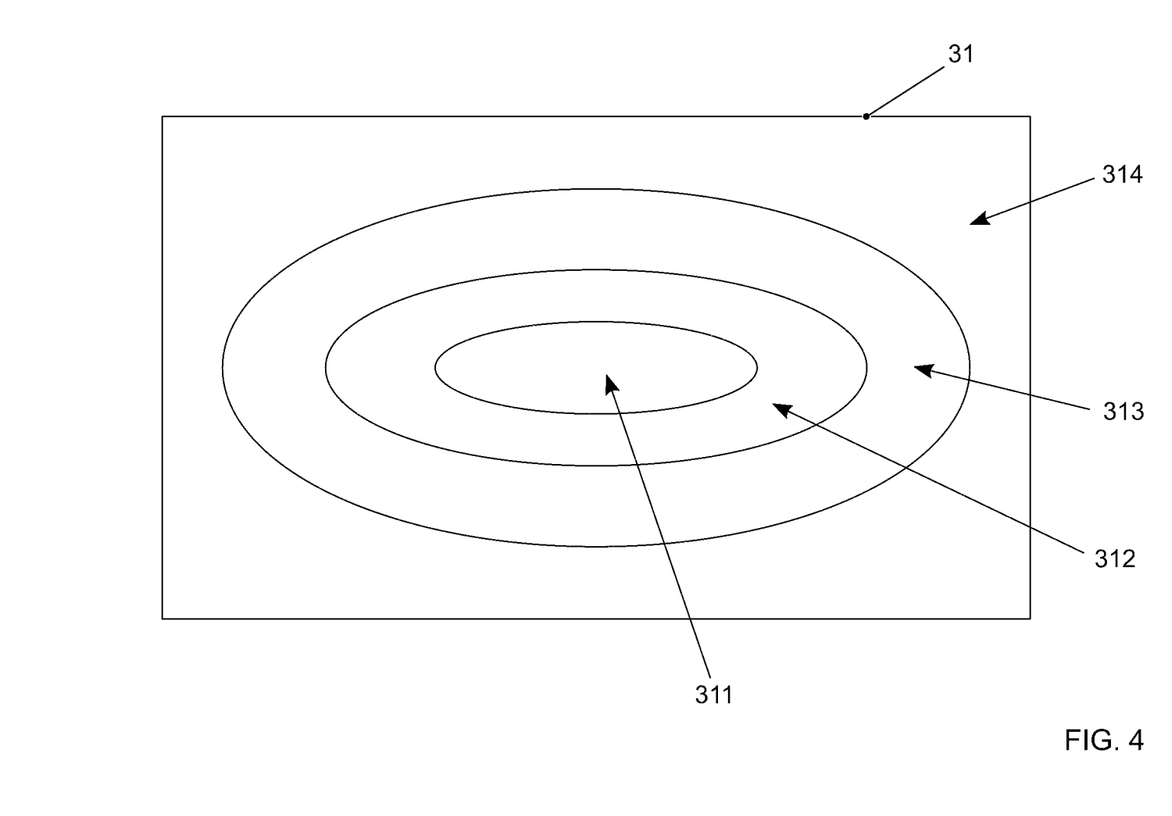
FIG. 4 shows a plan view of an example of a light guide for use in the display element of FIG. 3.

FIG. 4 shows a plan view of an example of a light guide 31 for use in the display element 1 from FIG. 3. In this case, zones 311-314 in which light output coupling decreases in intensity from the inside to the outside are indicated schematically from the inside to the outside. For this purpose, a different number of microstructure elements per unit area can be provided in the different zones 311-314, or the microstructure elements are designed differently in such a way that they bring about a different extent of light output coupling in the different zones 311-314. A central zone 311 has the greatest extent of light output coupling. A zone 312 adjoining the central zone to the outside still has a large extent of light output coupling. A zone 313 adjoining the zone 312 to the outside still has at least a small amount of light output coupling. An outermost zone 314 has no or hardly any light output coupling. Such a light guide 31 has a characteristic with which the light distribution shown in FIG. 2 may be obtained.

Figure 5:
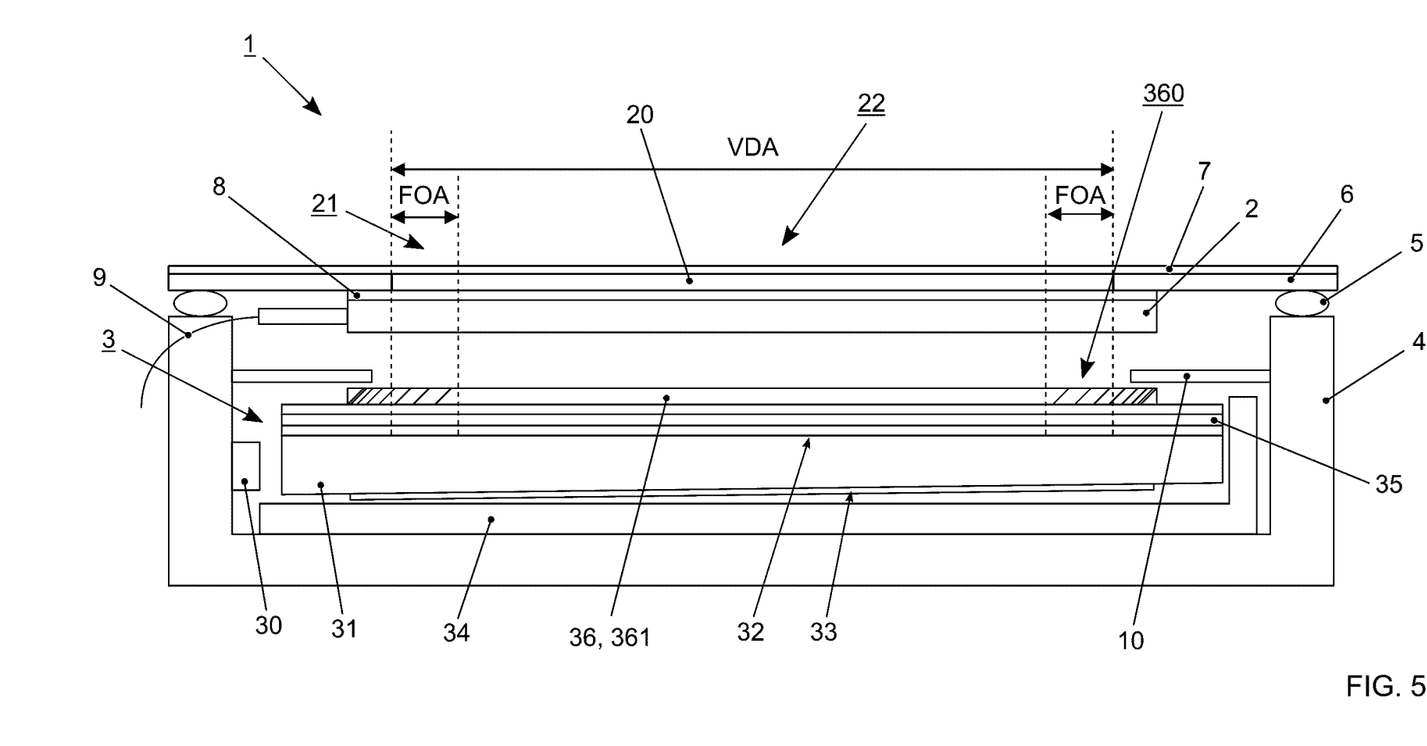
FIG. 5 schematically shows a second embodiment of a display element according to the disclosure.
Figure 6:
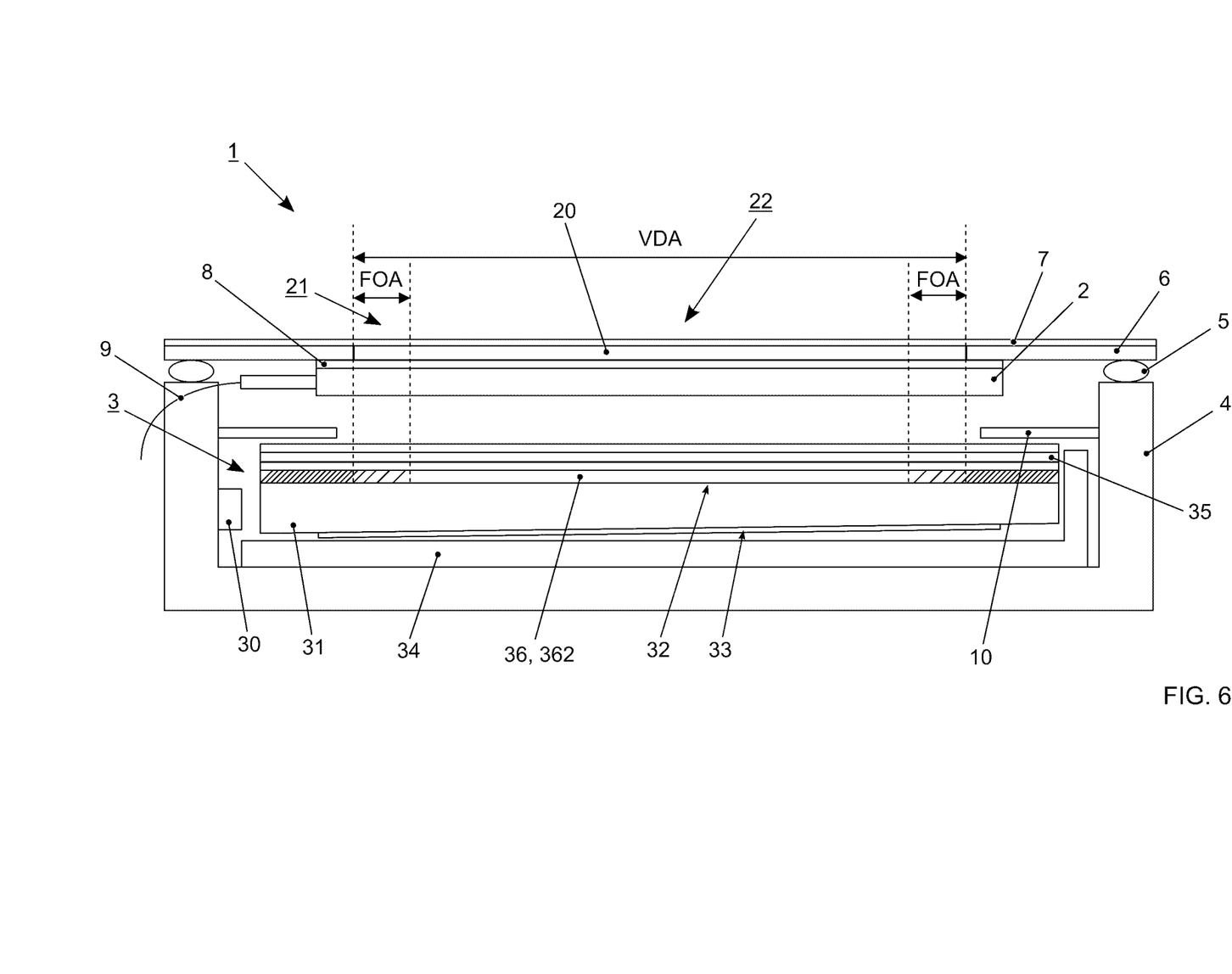
FIG. 6 schematically shows a third embodiment of a display element according to the disclosure.

FIG. 5 schematically shows a second embodiment of a display element 1 according to the disclosure. It largely corresponds to the display element 1 shown in Figure, but the decreasing light intensity in this exemplary embodiment is achieved by a fade-out element 36. In the example shown, the latter is designed as an optical layer 361, e.g. as a film or as a rigid or flexible plate, which in its peripheral region 360 has a transmission that decreases from the inside to the outside. In this case, the transmission decreases from 100% in the inner region to x % in the outer region of the peripheral region 360 so that a fade-out area FOA is realized. The value of x may go down to zero in this case. The change in transmission may be achieved, for example, by light-absorbing or light-scattering elements embedded in the optical layer 361. The change in transmission may also be achieved by changing a microstructure of the optical layer 361 in the peripheral region 360 or by changing the phase of the material of the optical layer 361 in this region. The optical layer 361 is arranged as the uppermost layer on the optical stack 35 in FIG. 5, but it may also be arranged at a different position in the optical stack 35. A corresponding third embodiment of a display element 1 according to the disclosure, in which an optical layer 362 is arranged as the bottom-most layer of the optical stack 35 directly on the light guide 31, is shown in FIG. 6.

Figure 7:
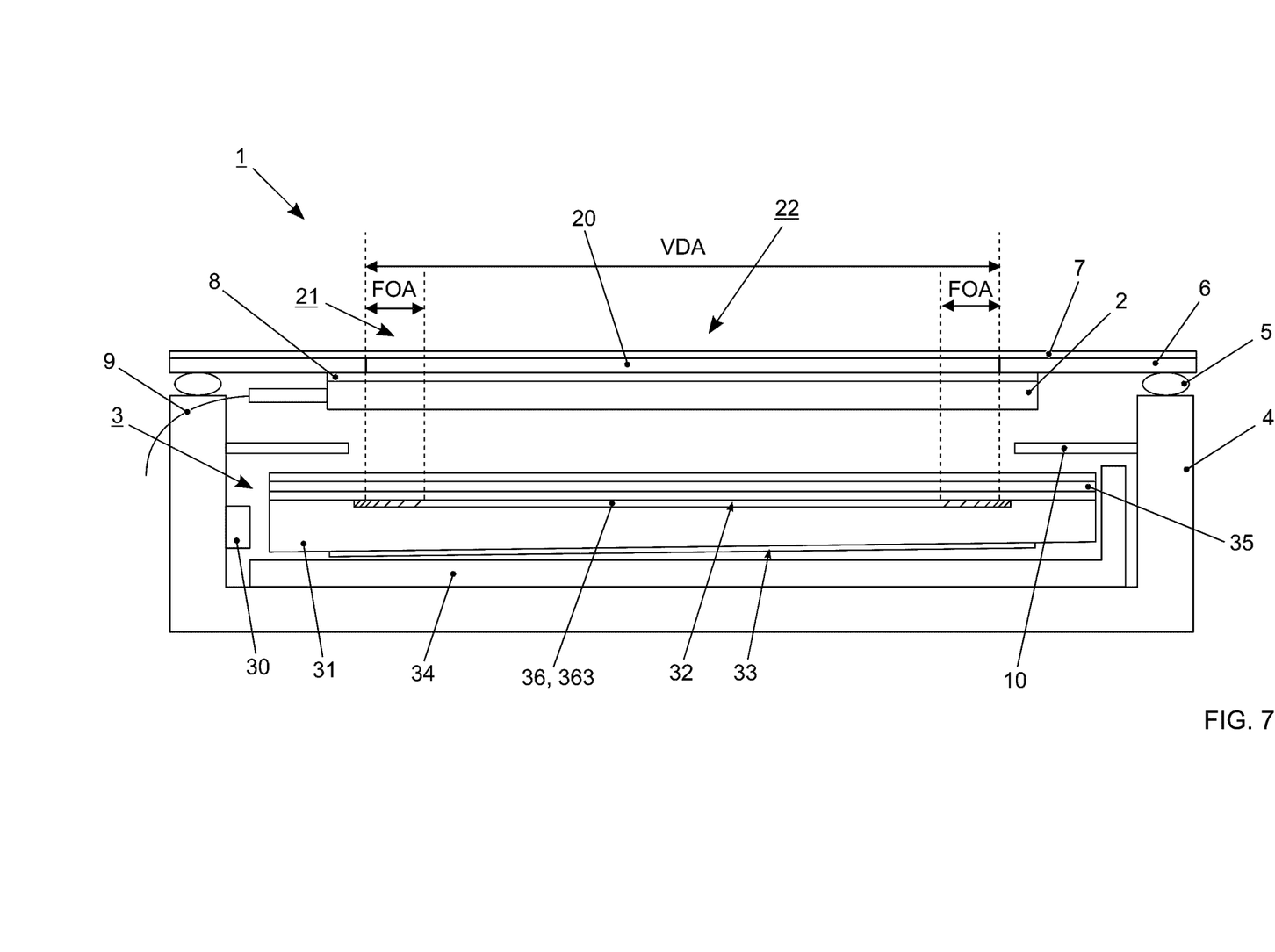
FIG. 7 schematically shows a fourth embodiment of a display element according to the disclosure.

FIG. 7 schematically shows a fourth embodiment of a display element 1 according to the disclosure. It largely corresponds to the display element 1 shown in FIG. 6, but in this case the fade-out element 36 is a print 363 applied to the light guide 31, the transmission of which decreases from the inside to the outside in the fade-out area FOA. The use of a print 363 requires no additional element needing to be produced, adjusted and connected to the other elements.

Figure 8:
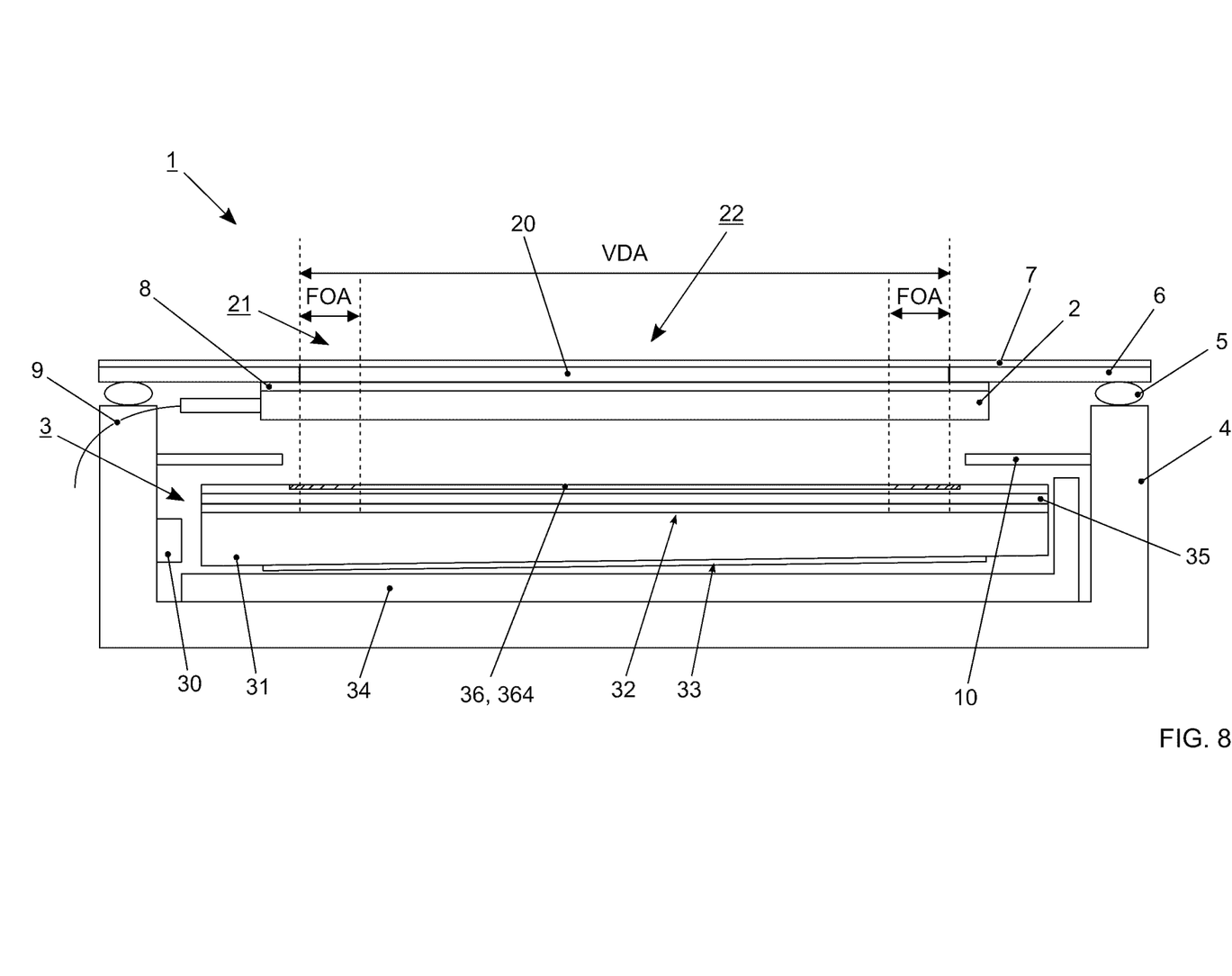
FIG. 8 schematically shows a fifth embodiment of a display element according to the disclosure.

FIG. 8 schematically shows a fifth embodiment of a display element 1 according to the disclosure. It largely corresponds to the display element 1 shown in FIG. 5, but in this case the fade-out element 36 is not an additional component, but rather a print 364 applied to the uppermost of the layers of the optical stack 35 that are already present, the transmission of which decreases from the inside to the outside in the fade-out area FOA.

Figure 9:
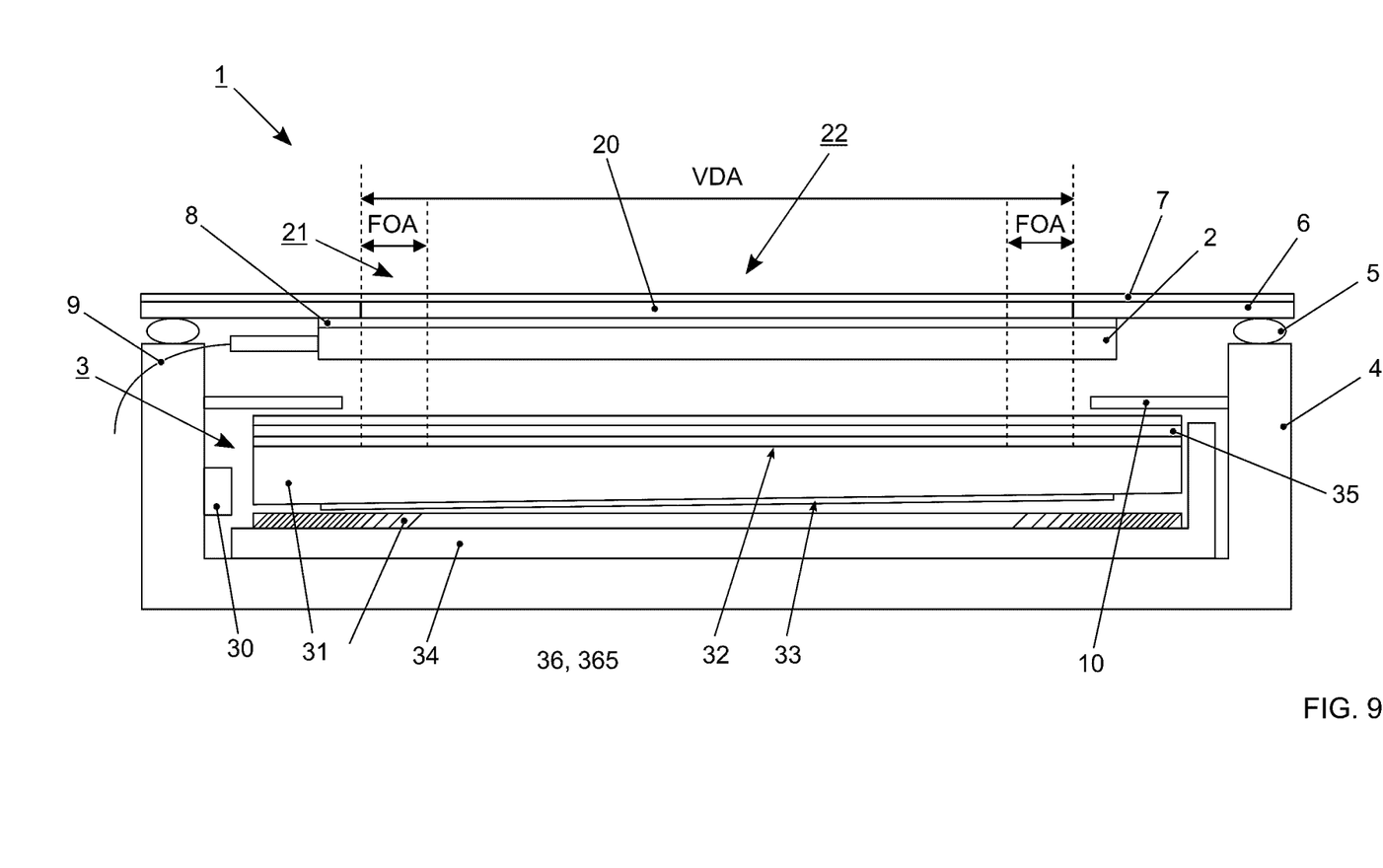
FIG. 9 schematically shows a sixth embodiment of a display element according to the disclosure.

FIG. 9 schematically shows a sixth embodiment of a display element 1 according to the disclosure. It largely corresponds to the display element 1 shown in FIG. 5, but in this case the fade-out element 36 is an optical layer 365 which is arranged on the reflector 34, for example as a film or as a rigid or flexible plate with location-dependent transmission in the peripheral region, similar to that described above.

Figure 10:
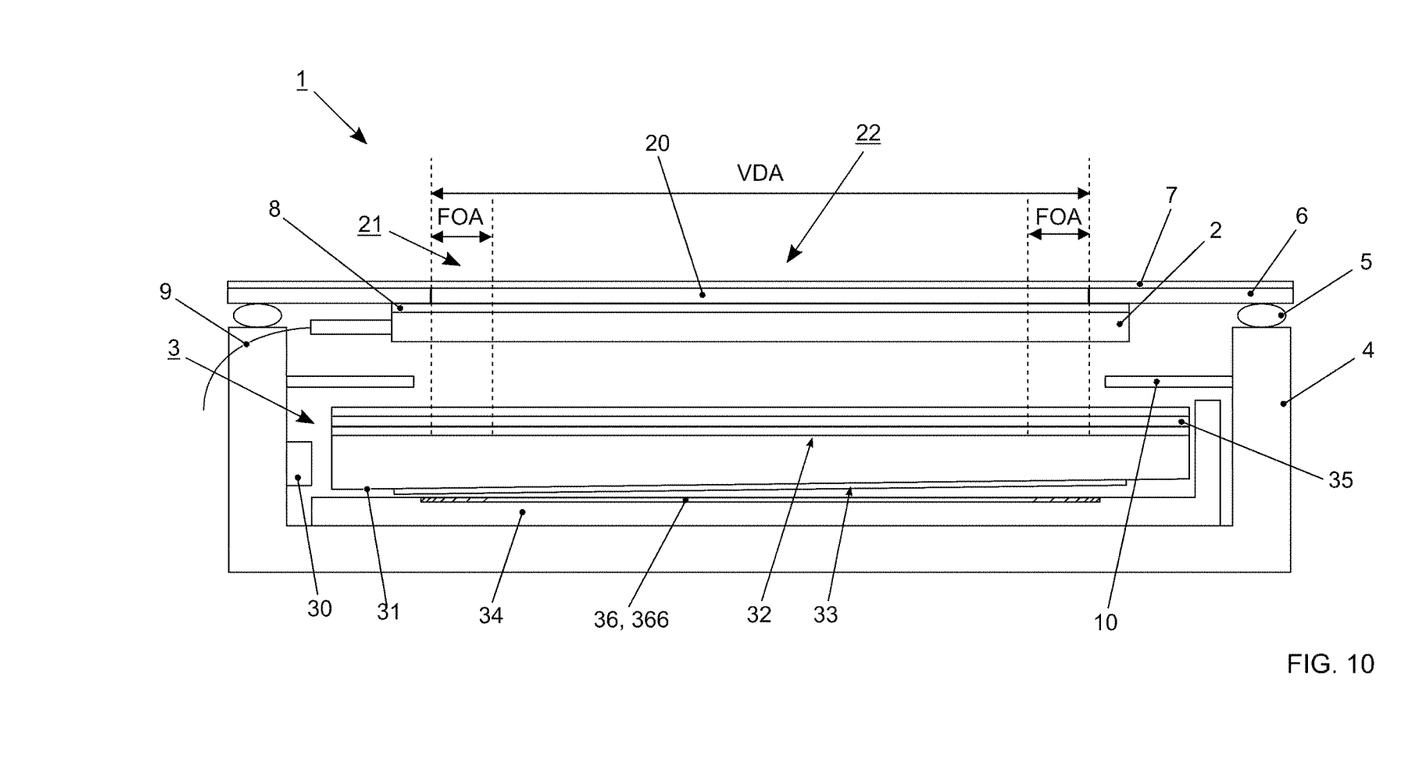
FIG. 10 schematically shows a seventh embodiment of a display element according to the disclosure.

FIG. 10 schematically shows a seventh embodiment of a display element 1 according to the disclosure. It largely corresponds to the display element 1 shown in FIG. 9, but in this case the fade-out element 36 is a print 366 applied to the reflector 34. There is also the possibility that the reflector 34 is designed as a film, to which a printed surface is applied as a fade-out element 36. A further variant consists in the reflector 34 being designed as a vapor-deposited metal layer which has less material in the fade-out area FOA, for example a thinner layer or a layer provided with holes, i.e. non-reflective regions. In these variants, the reflectivity decreases from the inside to the outside in the fade-out area FOA, which results in correspondingly less light being incident on the peripheral region of the display panel 2.

The optical layers 361, 362, 365 and prints 363, 364, 366 described above are examples of light-influencing fade-out elements 36 according to the disclosure. A combination of the first embodiment with one of the further embodiments and any other combination, including multiple combinations from the embodiments described, are suitable for achieving the desired result. These combinations are also solutions according to the disclosure, even if they are not described in detail here.

The invention claimed is:

1. A display comprising:
a display panel; and
a backlight, the backlight comprising:
  a light source arranged to emit light to the display panel; and
  a light guide coupled to the light source,
wherein the backlight is configured to emit light of a first light intensity to a peripheral region of the display panel and a second light intensity to a central region of the display panel, and
wherein the first light intensity is less than the second light intensity,
wherein the backlight further comprises microstructuring configured to couple out light received from the light source to the display panel, and
wherein the microstructuring is configured to couple out light of the first intensity from the light guide to the peripheral region of the display panel and couple out light of the second intensity from the light guide to the central region of the display panel.

2. The display as claimed in claim 1, wherein the microstructuring is arranged on an upper side of the light guide that faces the display panel, on a lower side of the light guide that opposes the upper side of the light guide, or on the upper side and the lower side of the light guide.

3. The display as claimed in claim 1, wherein the microstructuring comprises a plurality of coupling-out structures, and
wherein microstructuring is configured to couple out the light of the first intensity from the light guide to the peripheral region of the display panel based on a quantity of the location-dependent plurality of coupling-out structures or a location-dependent property of the plurality of coupling-out structures, the location-dependent property comprising at least one of location-dependent depth structure, a location-dependent angle of inclination, or a location-dependent size of the plurality of coupling-out structures.

4. The display as claimed in claim 1, wherein the light of the first light intensity has a gradient in the peripheral region of the display panel.

5. The display as claimed in claim 1, wherein a first amount of light of the first intensity is less than a second amount of light of the second intensity.

6. A display comprising:
a display panel; and
a backlight, the backlight comprising:
  a light source arranged to emit light to the display panel; and
  a light guide coupled to the light source,
wherein the backlight is configured to emit light of a first light intensity to a peripheral region of the display panel and a second light intensity to a central region of the display panel, and
wherein the first light intensity is less than the second light intensity,
wherein the backlight further comprises at least one light-influencing fade-out element configured to transmit light of the first intensity from the light guide to the peripheral region of the display panel and transmit light of the second intensity from the light guide to the central region of the display panel.

7. The display as claimed in claim 6, wherein the at least one light-influencing fade-out element is an optical layer of an optical stack of the backlight having a transmission gradient to transmit the light of the first intensity from the light guide to the peripheral region of the display panel and transmit the light of the second intensity from the light guide to the central region of the display panel.

8. The display as claimed in claim 6, wherein the at least one light-influencing fade-out element is a print applied to the light guide or to an optical stack of the backlight having a transmission gradient to transmit the light of the first intensity from the light guide to the peripheral region of the display panel and transmit the light of the second intensity from the light guide to the central region of the display panel.

9. The display as claimed in claim 6, wherein the backlight further comprises a reflector, and
wherein the at least one light-influencing fade-out element is an optical layer arranged on the reflector or a print applied to the reflector having a transmission gradient to transmit the light of the first intensity from the light guide to the peripheral region of the display panel and transmit the light of the second intensity from the light guide to the central region of the display panel.

10. The display as claimed in claim 6, wherein the light of the first light intensity has a gradient in the peripheral region of the display panel.

11. The display as claimed in claim 6, wherein a first amount of light of the first intensity is less than a second amount of light of the second intensity.

* * * * *